(12) United States Patent
Fishburn

(10) Patent No.: US 7,066,230 B2
(45) Date of Patent: Jun. 27, 2006

(54) VACUUM LAMINATOR

(75) Inventor: Charles E. Fishburn, Indianapolis, IN (US)

(73) Assignee: NPP Packaging Graphics Specialists, Inc., Indianapolis, IN (US)

( * ) Notice: Subject to any disclaimer, the term of this patent is extended or adjusted under 35 U.S.C. 154(b) by 401 days.

(21) Appl. No.: 10/447,068

(22) Filed: May 28, 2003

(65) Prior Publication Data
US 2003/0221774 A1 Dec. 4, 2003

Related U.S. Application Data

(60) Provisional application No. 60/448,220, filed on Feb. 19, 2003, provisional application No. 60/384,054, filed on May 29, 2002.

(51) Int. Cl.
*B32B 37/10* (2006.01)
(52) U.S. Cl. ............ 156/382; 156/381; 156/574; 156/580; 156/285; 156/286
(58) Field of Classification Search ........... 156/285, 156/286, 381, 382
See application file for complete search history.

(56) References Cited

U.S. PATENT DOCUMENTS

| 1,132,971 | A |  | 3/1915  | Price |
|-----------|---|--|---------|-------|
| 3,698,990 | A |  | 10/1972 | Shields |
| 3,767,097 | A |  | 10/1973 | Watts et al. |
| 4,101,364 | A |  | 7/1978  | Tsuknada et al. |
| 4,264,400 | A | * | 4/1981 | Breitmar ............... 156/497 |
| 4,285,758 | A | * | 8/1981 | Clausen et al. ......... 156/498 |
| 4,323,637 | A |  | 4/1982  | Chen et al. |
| 4,427,749 | A |  | 1/1984  | Graetzel et al. |
| 4,450,034 | A |  | 5/1984  | Stern |
| 4,714,511 | A |  | 12/1987 | Nakao |
| 5,100,493 | A |  | 3/1992  | Leclere et al. |
| 5,919,842 | A |  | 7/1999  | Mounsey |
| 6,227,270 | B1 |  | 5/2001 | Itoyama et al. |
| 6,248,203 | B1 |  | 6/2001 | Beck |
| 6,520,234 | B1 | * | 2/2003 | Anderson et al. ......... 156/361 |

* cited by examiner

*Primary Examiner*—Jessica Rossi
*Assistant Examiner*—Jayme L. Brown
(74) *Attorney, Agent, or Firm*—Brinks Hofer Gilson Lione

(57) ABSTRACT

An apparatus and a method for vacuum laminating an article to a substrate. The apparatus comprises a movable assembly engaged with a support surface for the substrate and movable relative thereto. The movable assembly comprises a manifold for receiving vacuum force from a source of vacuum, and a fin member for translating the vacuum force across substantially a width of the printing plate. A holder for the article is positioned such that an end of said article to be laminated is engageable with the support surface. A moving device is provided for passing the movable assembly and the article over the printing plate as the vacuum force is translated across the printing plate, such that the article is laminated to the printing plate without substantial air entrapment.

22 Claims, 10 Drawing Sheets

VACUUM LAMINATOR

RELATED APPLICATIONS

The present patent document claims the benefit of the filing date under 35 U.S.C. §119(e) of Provisional U.S. Patent Application Ser. No. 60/384,054, filed May 29, 2002, and Ser. No. 60/448,220, filed Feb. 19, 2003, both of which are hereby incorporated by reference.

BACKGROUND

1. Technical Field

This invention relates generally to an apparatus and a method for laminating components to a substrate. More particularly, this invention relates to an apparatus and method for vacuum lamination of a two-sided tape and/or a cushion material to a printing plate.

2. Background Information

Flexography is a well-known process for printing advertising material and other indicia on packaging and related materials. The term flexography applies broadly to printing processes utilizing a relief printing plate produced on a flexible substrate. Flexographic printing plates have an uneven surface because of the relief difference between the print and non-print areas of the plate. The presence of the uneven surface becomes problematic when attempting to adhere the printing plate to a two-sided tape sheet or to a foam cushion material for use in a printing operation.

In order to prepare a printing plate for flexography, a two-sided tape is normally applied to the back, or non-relief, side of the printing plate. The two-sided tape is used to adhere the printing plate to a carrier sheet that is thereafter mounted on the printing cylinder.

There are two existing procedures that are generally used to apply a two-sided tape to the non-relief side of the printing plate. One procedure involves unrolling the two-sided tape onto a table surface, and then manually placing one or more printing plates on the tape. In the other procedure, a two-roll laminating apparatus is used, wherein the tape is applied to the plate as the tape and plate are passed between the rolls of the laminating apparatus.

With the first of these procedures, air generally becomes entrapped between the tape and the plate(s) during the application process, due primarily to the uneven surface that is caused by the relief of the plate. When air is entrapped in this manner, one or more air bubbles are formed between the plate and the tape. The air bubbles must be evacuated prior to the printing operation by manually poking or cutting the tape at the site of the bubble, and thereafter forcing the air out. This activity is very labor intensive, since a technician must continually interrupt the tape application process to evacuate the air bubbles. As a result, the cost of the printing plates increases, and/or the capacity to turn out a large number of plates in a given period of time is reduced. If the air entrapped between the tape and the plate is not evacuated, a high spot may result in the plate at that location. A high spot in a plate can cause printing problems (distorted graphics), as well as premature plate wear. Use of the two-roll laminating apparatus for application of the tape to the plate normally results in the entrapment of less air than the manual process; however, the amount of entrapped air may still be larger than desired. In addition, the amount of air entrapment increases with the lamination process as larger plates are used.

During a printing operation, variations in printing pressure are also known to cause printing problems, such as distorted graphics. In order to minimize the occurrence of such problems, a compressible layer, such as a urethane foam cushion, is sometimes adhered to the printing plate. The use of a compressible layer allows the printing plate to maintain generally uniform thickness in the face of the pressure variations. The cushion is generally applied to the underside of the printing plate in a separate application and is not a component of the printing plate per se. The use of a cushion allows for greater flexing of the printing imaging area during the printing process, and allows the plate to rebound more rapidly to its original thickness so that high quality prints can be made.

There are two procedures that are generally used for applying a foam cushion material to the inside of a flexographic printing plate. Conventional photopolymeric printing plates generally include a dimensionally stable substrate on the back side of the printing plate. The first procedure involves delaminating the dimensionally stable substrate from the sheet photopolymer material prior to the development of the relief surface of the plate, and then exposing the back side of the photopolymer material to UV light to condition the floor of the printing plate. The cushion material is then laminated to the photopolymer material by either the manual method or the two-roll laminator referred to above. Following lamination, the sheet photopolymer printing plate is then exposed with ultraviolet light and chemically processed using normal printing plate production procedures. Normal laminating techniques can be employed in this procedure, since the photopolymer material has not yet been processed to form the relief surface prior to the lamination of the cushion material to the solid surface. However, since the printing plate is thereafter processed and developed with the foam cushion already attached inside the plate, great care must be taken to protect the foam cushion from the chemicals used during the plate development process.

The second procedure involves processing a liquid or sheet photopolymer printing plate using normal production procedures to form the relief surface, except in this instance the printing plate having the relief surface is provided with a removable back substrate sheet instead of the more conventional UV adhesive coated back substrate sheet. The removable back substrate sheet is delaminated from the printing plate, and the cushion material is then adhered to the printing plate. In this procedure normal laminating techniques cannot be used because of the uneven surface resulting from the relief difference between the print and non-print areas of the plate. Air may become entrapped between the cushion material and the printing plate, causing delamination of the two materials, as well as premature wear and distorted graphics.

It is desired to provide an apparatus and method for laminating components to a substrate that is economical and convenient to use, and that avoids the problems of prior art devices.

BRIEF SUMMARY

The lamination problems described above are addressed by the apparatus and the method of the present invention.

In one embodiment, the present invention comprises an apparatus for vacuum laminating an article, such as a two-sided tape or a foam cushion material to a flexographic printing plate. The printing plate can then be adhered to a carrier sheet for use in printing items such as corrugated boxes, displays, bags, labels and flexible packaging.

In another embodiment, the present invention comprises an apparatus for laminating an article to a printing plate. The apparatus includes a movable assembly engaged with a support surface and movable relative thereto. The movable assembly comprises a manifold member for receiving vacuum force from a source of vacuum, and a fin member for translating the vacuum force across substantially a width of the printing plate. A holder for the article is positioned such that an end of the article is engageable with the printing plate. A moving device is provided for passing the movable assembly and the article over the printing plate as the vacuum force is translated across the printing plate, such that the article is laminated to the printing plate without substantial air entrapment.

In still another embodiment, the invention comprises a method for laminating an article to a substrate. The method includes the step of providing a support surface for the substrate, a vacuum source, and a movable assembly associated with the support surface, the movable assembly in communication with the vacuum source for receiving vacuum force therefrom and translating the vacuum force across substantially the width of the article to be laminated. The substrate is positioned on the support surface, and a leading edge of the article is fed through the movable apparatus and attached to the support surface. The vacuum source is activated to pull vacuum force through the movable assembly, wherein the vacuum force raises the substrate such that the substrate engages the movable assembly to create a substantially level surface. The movable assembly is passed over the substrate in the presence of the vacuum, whereby the article is laminated to the substrate without substantial air entrapment.

BRIEF DESCRIPTION OF THE DRAWINGS

The present invention will become more fully understood from the detailed description given hereinbelow and the accompanying drawings, which are provided by way of illustration only, and thus, are not limitative of the scope of the present invention.

DETAILED DESCRIPTION OF THE PREFERRED EMBODIMENTS

Figure 1:
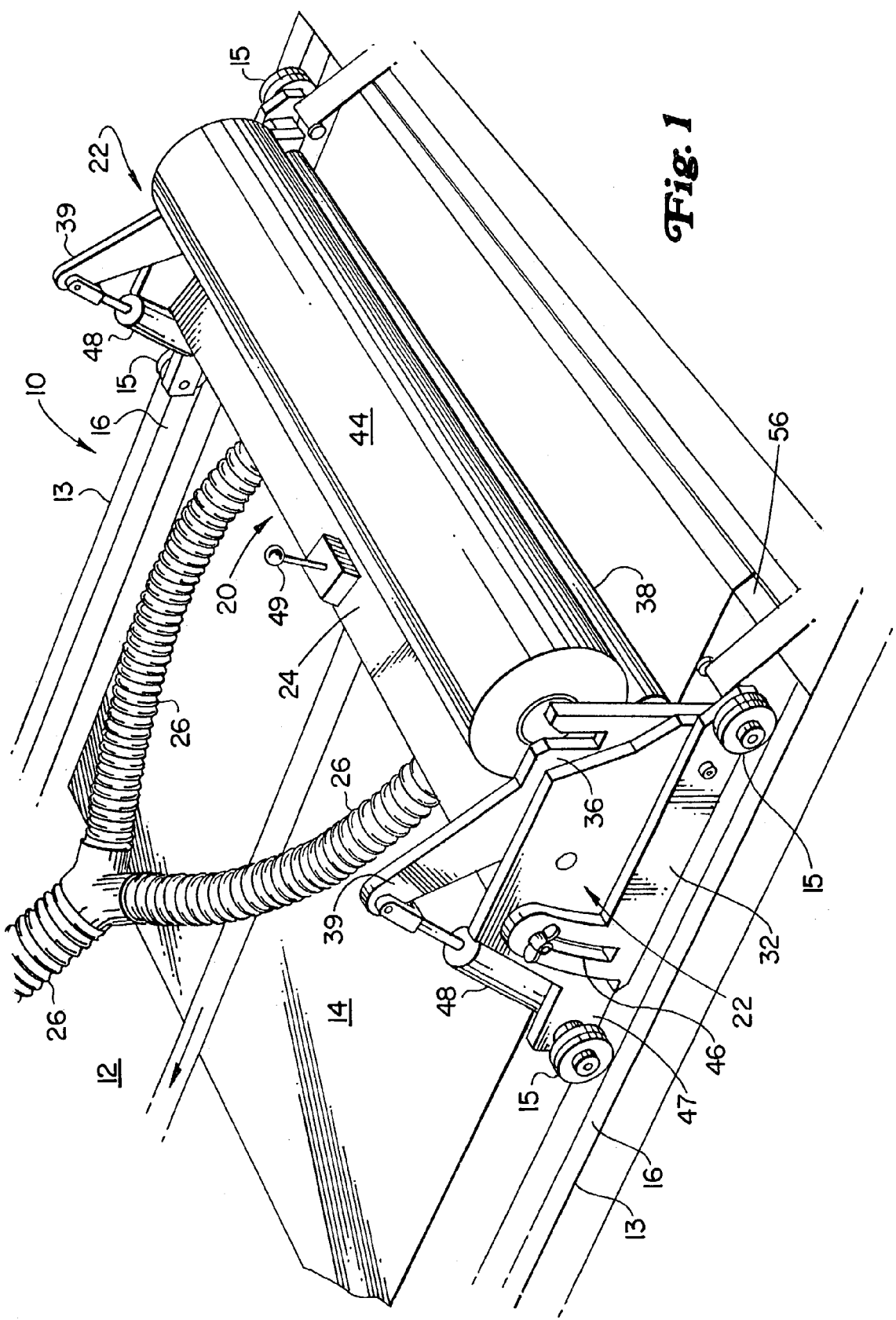
FIG. 1 is a perspective view of a support surface and the inventive lamination apparatus for laminating a two-sided tape to a printing plate.
Figure 2:
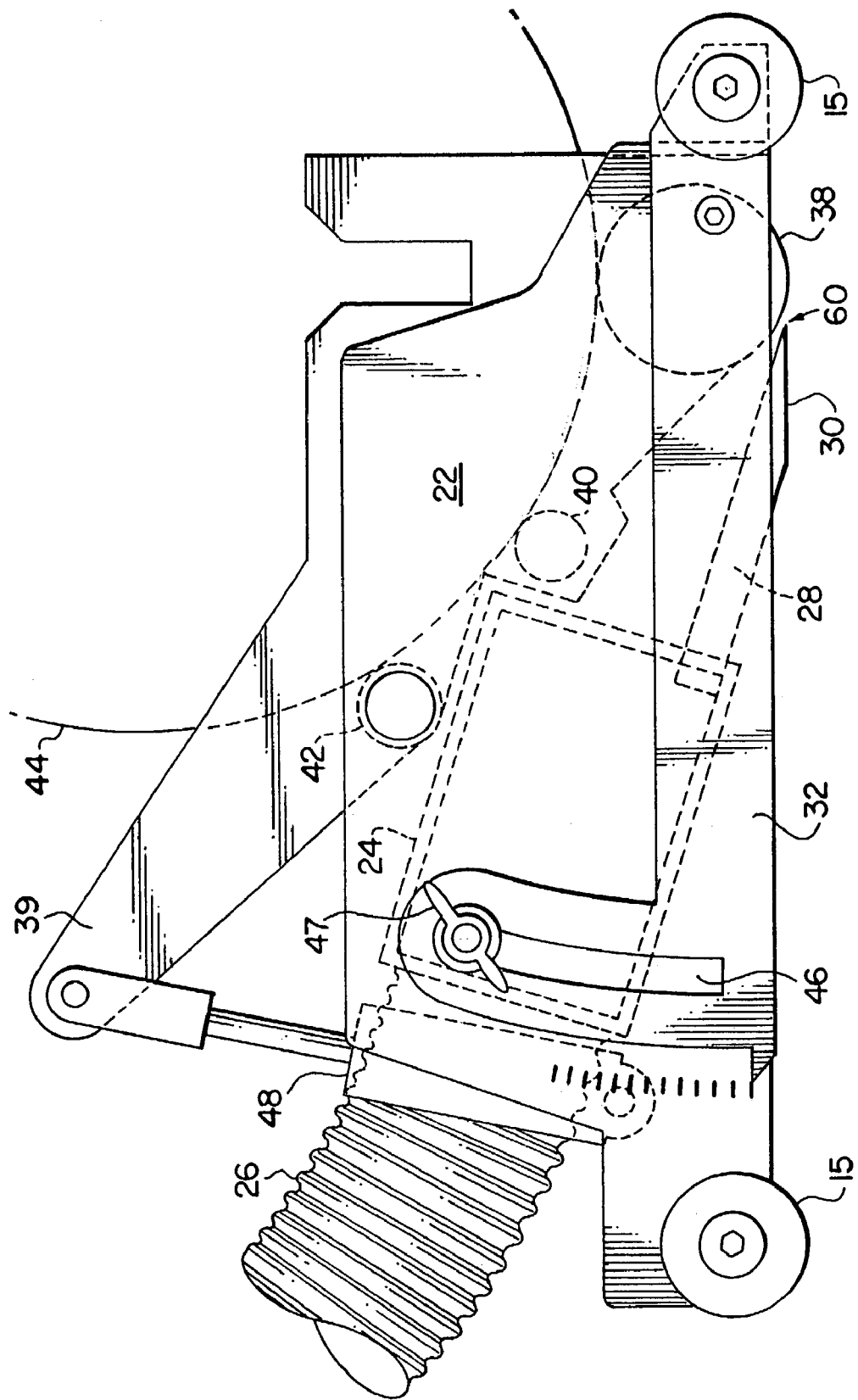
FIG. 2 is a side view, partially in section, of the inventive lamination apparatus.

The inventive apparatus described herein is utilized to laminate a component to a substrate in a manner such that air is not entrapped between the component and the substrate. The apparatus may be advantageously utilized to laminate a two-sided tape and/or a cushion material to a printing plate.

According to one embodiment of the invention, the inventive apparatus comprises a vacuum pump for drawing a vacuum between a two-sided tape and a printing plate. The vacuum generated by the pump evacuates air from the area where the tape joins the plate during the lamination operation, and assists in leveling the uneven surface of the plate for lamination. This allows a consistent adhesion of the tape to the plate in a manner that is virtually free of air bubbles. The operation also eliminates the necessity to interrupt the application operation in order to manually evacuate the bubbles of entrapped air.

The vacuum lamination process utilizing the inventive laminating apparatus is further described with reference to the accompanying figures.

Lamination of Two-Sided Tape to a Printing Plate:

FIGS. 1–6 illustrate one embodiment of the inventive apparatus 10. This embodiment may be used for laminating an article such as a two-sided tape to the generally flat underside (i.e., the non-relief side) of a substrate, such as a printing plate. As shown in the figures, a support surface 12 is provided for supporting the printing plate 14 that is to be laminated. Support surface 12 can be dimensioned to accommodate plates of virtually any size. Preferably support surface 12 is constructed to accommodate plates, or groups of plates, arranged to cover a surface area of about 52 inches by 80 inches (132 cm by 203 cm). Support surface 12 is preferably a flat tabletop surface specially dedicated for use in a lamination operation.

A printing plate 14 having a relief surface is positioned on the support surface 12 with the flat, non-relief side facing up. For best results, the printing plate is secured to the support surface along the support surface edges in a convenient manner such as by taping the edges of the plate to the support surface, to prevent shifting or other movement of the printing plate during the lamination operation. As is conventional with printing plates, the non-relief side of the printing plate 14 is formed to be dimensionally stable.

A movable vacuum assembly 20 is positioned in engagement with the longitudinal edges 13 of the support surface 12 such that during operation of the inventive apparatus the movable assembly 20 can be passed over the printing plate to laminate the tape to the plate. The movable assembly 20 can be engaged with the longitudinal edges 13 of the support surface in any conventional manner to accomplish such movement. In the embodiment shown, assembly 20 is engaged with longitudinal edges 13 by the engagement of wheels 15 of the vacuum assembly with complementary rails 16 mounted on each longitudinal edge of the support surface as shown in the drawings. It is not critical that a wheel/rail arrangement be provided as shown in the drawings, and any conventional mechanism may be substituted for that shown. The objective of the wheel/rail arrangement is merely to provide a mechanism for enabling the movable vacuum assembly 20 to move longitudinally along the support surface 12, and thereby pass over the printing plate 14, during the lamination operation.

Figure 10:
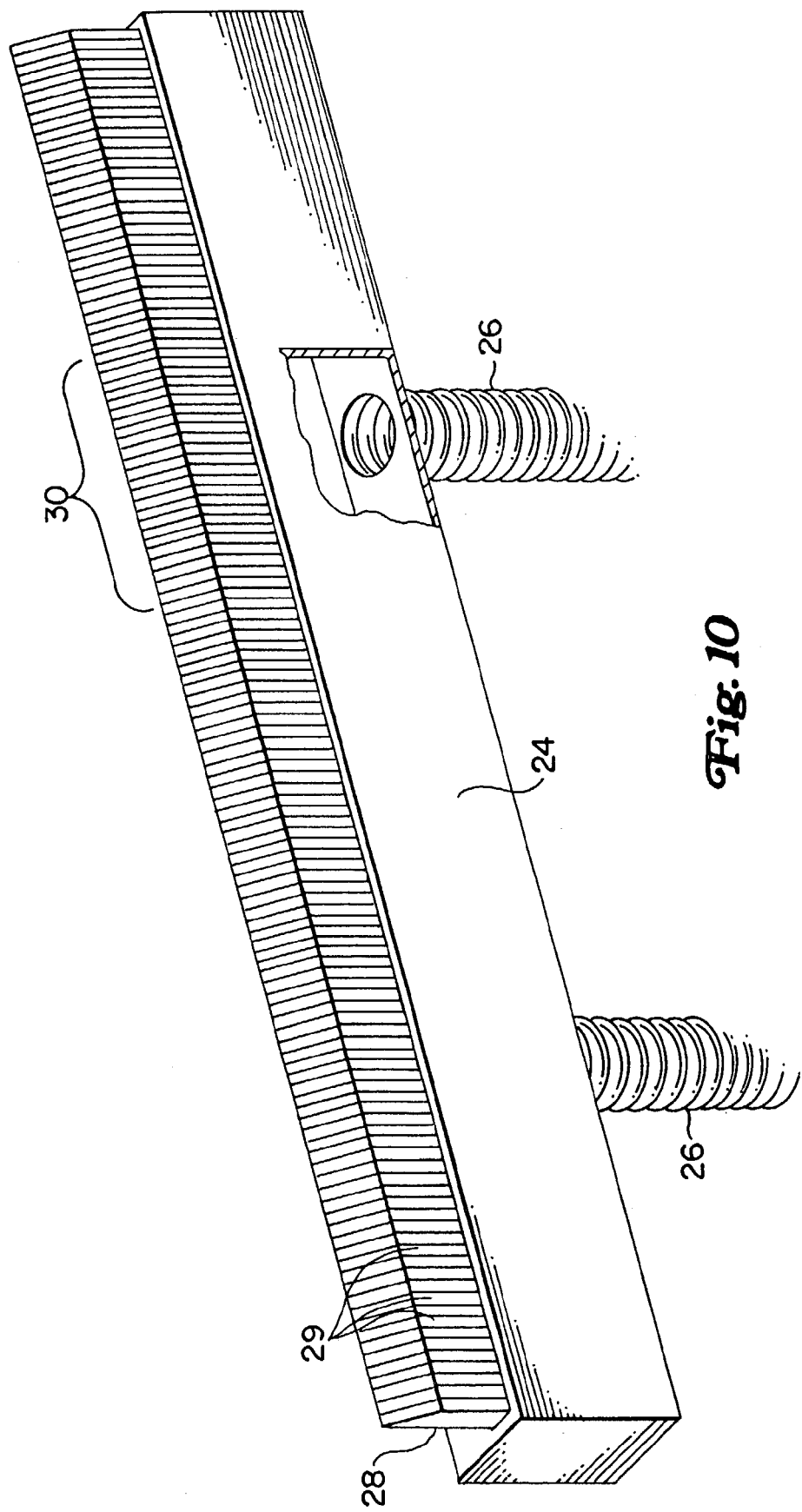
FIG. 10 is a perspective view of the manifold and the fins.

Movable assembly 20 includes a manifold 24 spanning the frame members for receiving vacuum force from a suitable source of vacuum, such as a conventional vacuum pump. Manifold 24 can be formed from any conventional structural material that is suitable for such purposes. In the preferred embodiment, manifold 24 is formed from an aluminum tube, and has dimensions of about 57 inches×2 inches×3 inches (144.5 cm×5.1 cm×7.6 cm). Movable assembly 20 also includes a mechanism, such as fins 28, for translating the vacuum across the width of printing plate 14. Manifold 24 and fins 28 are best shown in FIG. 10. In a preferred embodiment, fins 28 comprise a structure comprising a plurality of adjoining vacuum chambers 29 arranged to receive the vacuum force and to extend that force across the length of manifold 24. The chambers terminate into an open-ended blade surface 30. Blade surface 30 translates the vacuum force transversely across the width of the printing plate. Fins 28 are formed from a generally rigid material, such as LEXAN plastic corrugated material, and may be formed into various configurations and sizes for a particular use, and have varying numbers of chambers. When used for laminating printing plates, it is preferred that the fins have dimensions of about 54 inches×⅜ inches×3 ½ inches (137.2 cm×0.95 cm×8.9 cm).

Preferably, movable vacuum assembly 20 also includes a housing. In the embodiment shown, the housing comprises a frame member 22 at each lateral side of the assembly. Those skilled in the art will appreciate that the housing may have many possible configurations. In the embodiment shown, each of the two frame members 22 comprises a pivotable outer portion 32 and a pivotable inner portion 36.

Rods 38, 40, 42 comprise a holder for the roll of two-sided tape 44. The rods span the frame members as shown, and are oriented to define a cradle to support the roll of two-sided tape. See, e.g., FIGS. 2, 4 and 5. In a preferred embodiment, the tape roll 44 substantially rests on rod 38, and is positioned slightly off-center (i.e., the axis of roll 44 is to the left of the axis of rod 38 in the orientation shown in the drawings) to stabilize the tape roll and prevent it from rolling out of the apparatus. The roll of two-sided tape rests in the cradle defined by the rods, regardless of whether the apparatus is in the open configuration (FIG. 4) or the closed configuration (FIG. 5).

Although the drawings show the presence of three rods 38, 40, 42, to comprise the cradle, this number is not critical to the invention and more, or fewer, rods may be used for a particular application. For example, if it is desired to increase the stability of roll 44 in the apparatus, a fourth rod may be provided to increase the roundedness of the cradle configuration. This rod may be positioned, for example, to the right of roll 38 in the view shown in FIGS. 4 and 5, and aligned such that it rests against the circumference of roll 44, in the same manner as rods 38, 40, 42. In this event, pivotable inner frame portions 36 can be configured so that the additional rod(s) also span these frame portions 36.

Figure 9:
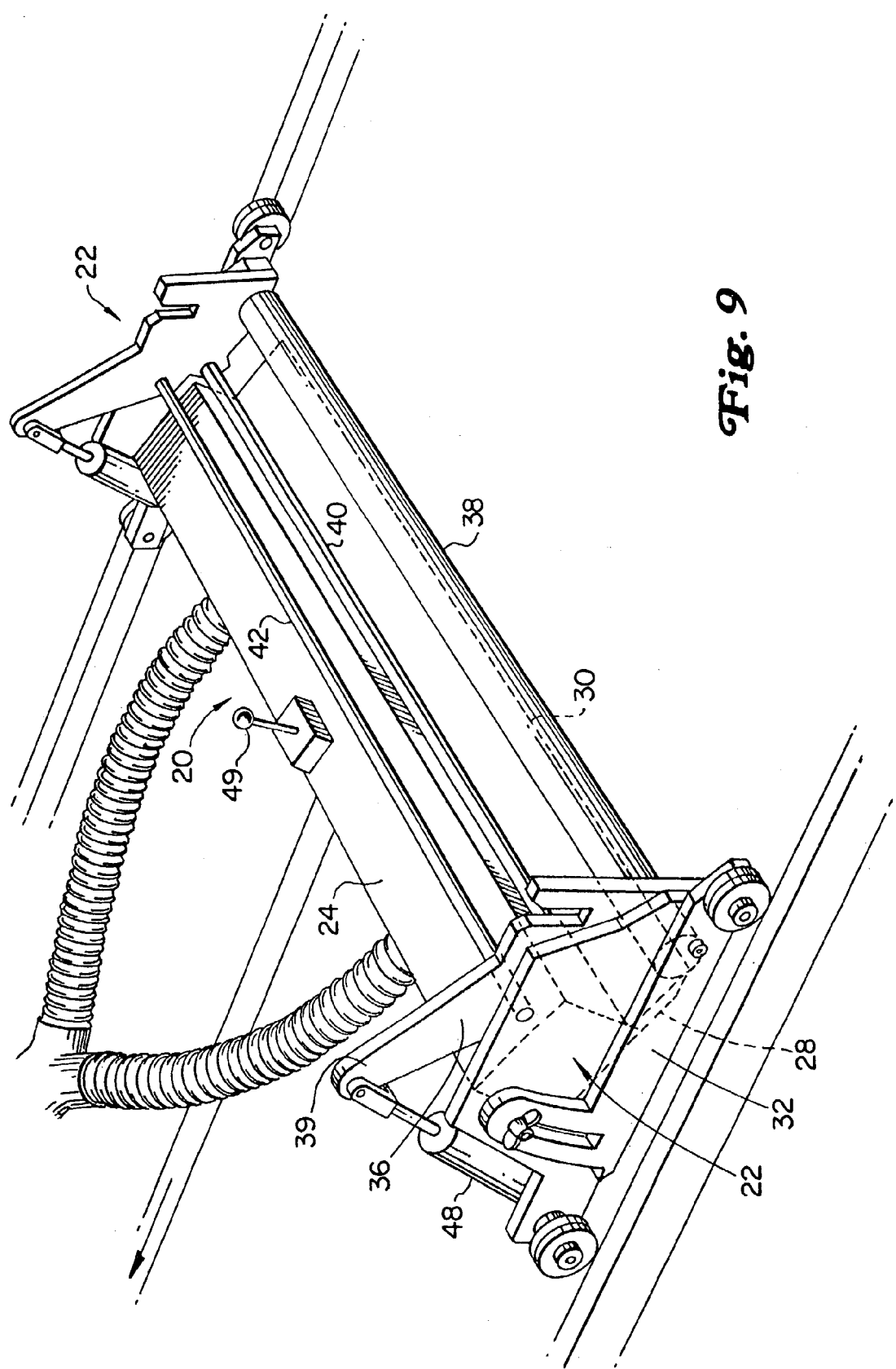
FIG. 9 is a perspective view similar to that of FIG. 1 with the two-sided tape removed to shows the rods.

Pivotable outer frame portion 32 includes a slot 46 and a wingnut 47. Slot 46 and wingnut 47 are operatively engaged with fins 28 such that the selected raising or lowering of pivotable outer portion 32 by loosening wingnut 47 selectively adjusts the vertical distance of fin blade surface 30 from the surface of printing plate 14. When pivotable outer portion 32 is fully moved to its lowest point in slot 46, as shown, e.g., in FIGS. 1 and 9, blade surface 30 pivots in a downward direction to its closest allowable distance from printing plate 14. This arrangement is employed when relatively thin materials, such as thin printing plates, are to be laminated to a substrate. Conversely, when a thicker printing plate is to be laminated, pivotable outer portion 32 can be adjusted to a selected higher point in the slot. When pivotable outer portion 32 is adjusted to highest point in the slot, the blade pivots in an upward direction to its maximum allowable distance from the printing plate. Although the presence of a mechanism such as pivotable outer portion 32 described above is preferred because it increases the versatility of the apparatus by allowing the lamination of materials having a wide range of thicknesses, this feature is not critical to the invention. Alternatively, the apparatus may be constructed for laminating an article or articles of a constant thickness, in which event the blade surface 30 of the fins 28 can have a fixed position in the movable assembly, and the slot/wingnut feature is not required.

Figure 4:
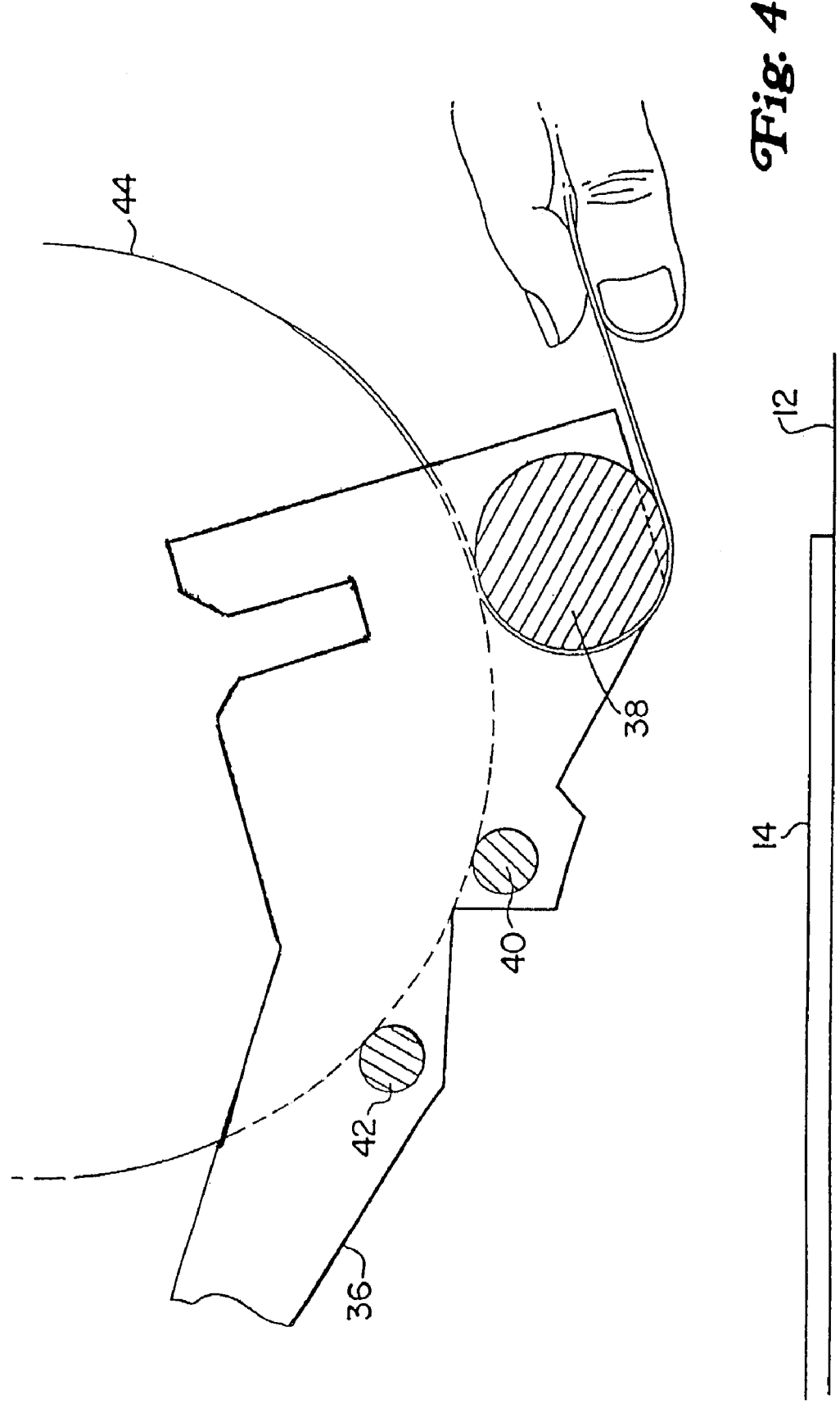
FIG. 4 is a side view, partially in section, of a portion of the lamination apparatus in the open position for threading the article to be laminated in the apparatus.
Figure 5:
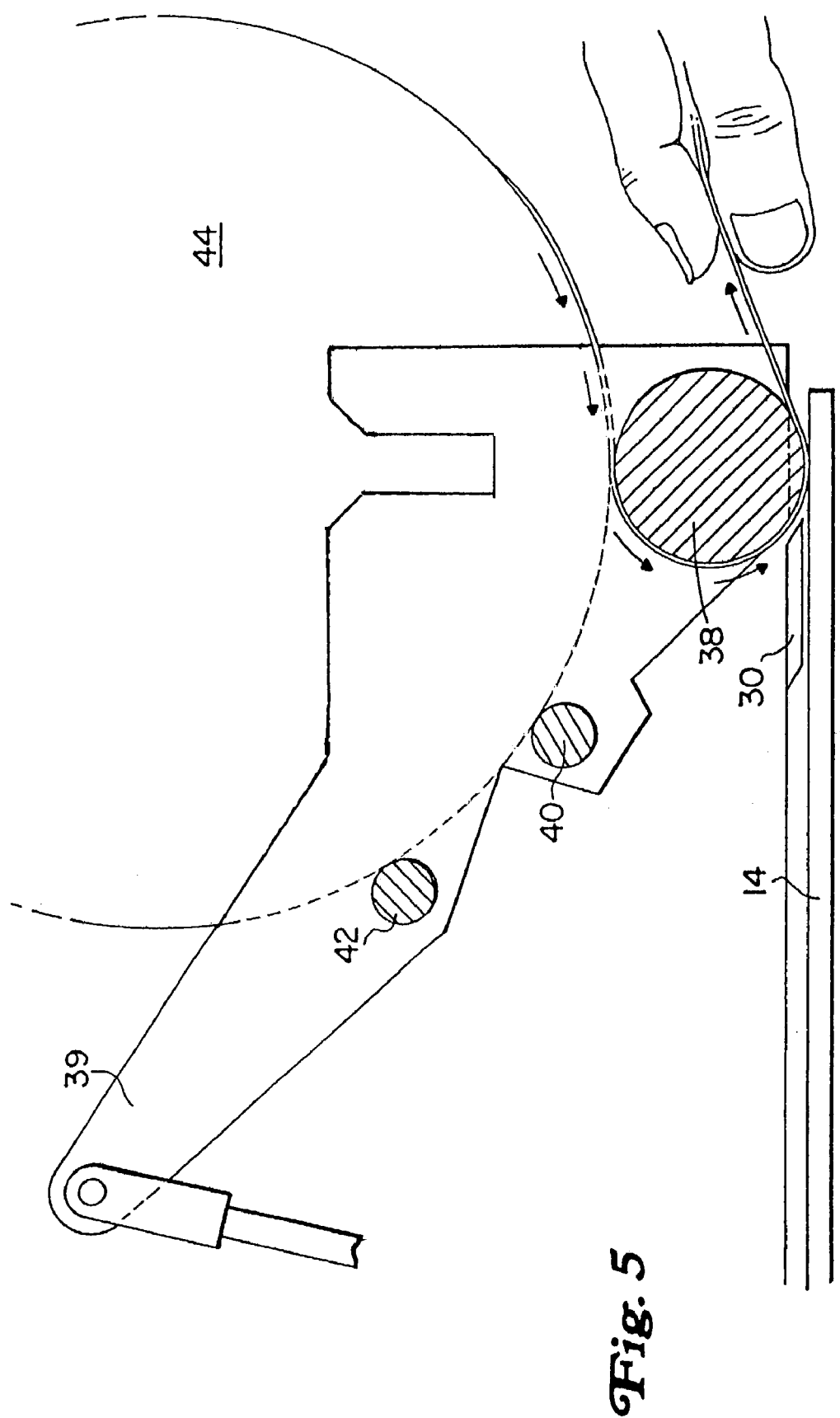
FIG. 5 is a side view, partially in section, of a portion of the lamination apparatus in the closed position following threading of the article.
Figure 6:
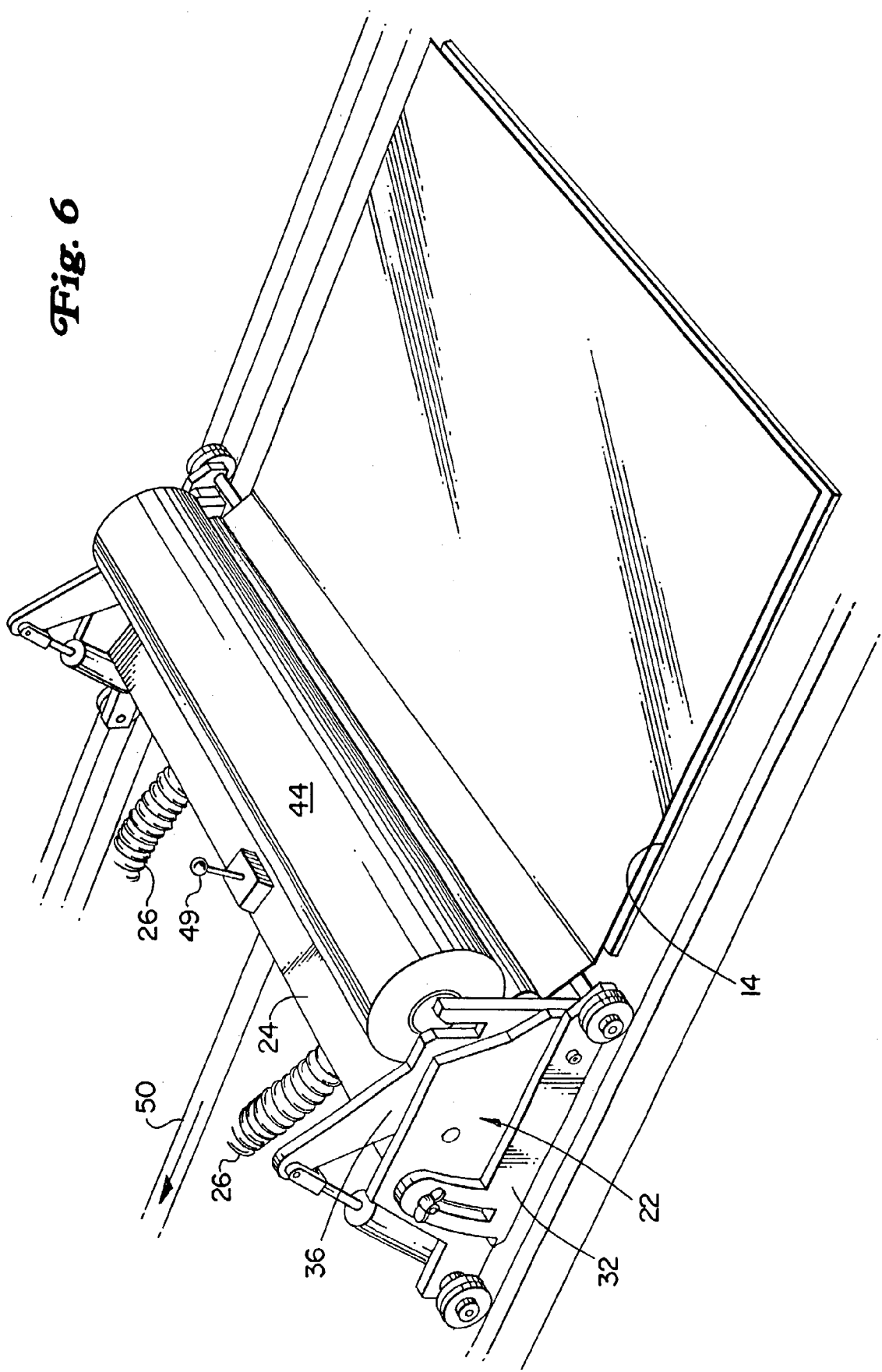
FIG. 6 is a view showing the lamination apparatus on a support surface after the apparatus has been passed over a printing plate.

A suitable automated or manual mechanism, such as air cylinder 48, is provided for pivoting inner frame portion 36 to establish the respective open and closed positions shown in FIGS. 4 and 5. When inner frame portion 36 is in the resting position, rod 38 essentially rests on the printing plate 14, as shown in FIGS. 1 and 5. When handle 49 is pushed in a forward direction the air cylinder is activated. Tail portion 39 of inner frame portion 36 is then pulled in a downward direction, and frame portion 36 pivots such that rod 38 is lifted off the printing plate into the open position, as shown in FIG. 4. In this position, the leading edge of two-sided tape 44 can be threaded around rod 38 from tape roll 44 as shown. Following the threading of the tape, handle 49 is returned to its original position. Air cylinder 48 is deactivated to lower rod 38 and lock it into the closed, resting position shown in FIG. 5. The end of the tape (shown in the figure as being grasped by the operator) is then adhered to the end of support surface 12 (FIG. 1), and the tape-loading process is now complete. Those skilled in the art will appreciate that many different variations of this arrangement for enabling the threading of the tape could be substituted for the arrangement described, and are considered within the scope of the invention.

Manifold 24 is attached at one end via hose 26 to the source of vacuum, such as a vacuum pump. Preferably, hose 26 branches off into two or more segments that are attached to manifold 24. The vacuum pump can be located at any convenient location, such as underneath the support table 12. Most conventional vacuum pumps are suitable for use, such as a pump having a capacity of about 6 to 12 hp (4.5 to 9 kw). A vacuum force between 4½ inches to 10 inches (11.4 cm to 25.4 cm) on a manometer may be used for a typical printing plate lamination. Those skilled in the art will appreciate that the amount of vacuum force required for a particular lamination operation may vary, and that the optimum amount of vacuum required for any desired operation can be readily determined without undue experimentation.

Figure 3:
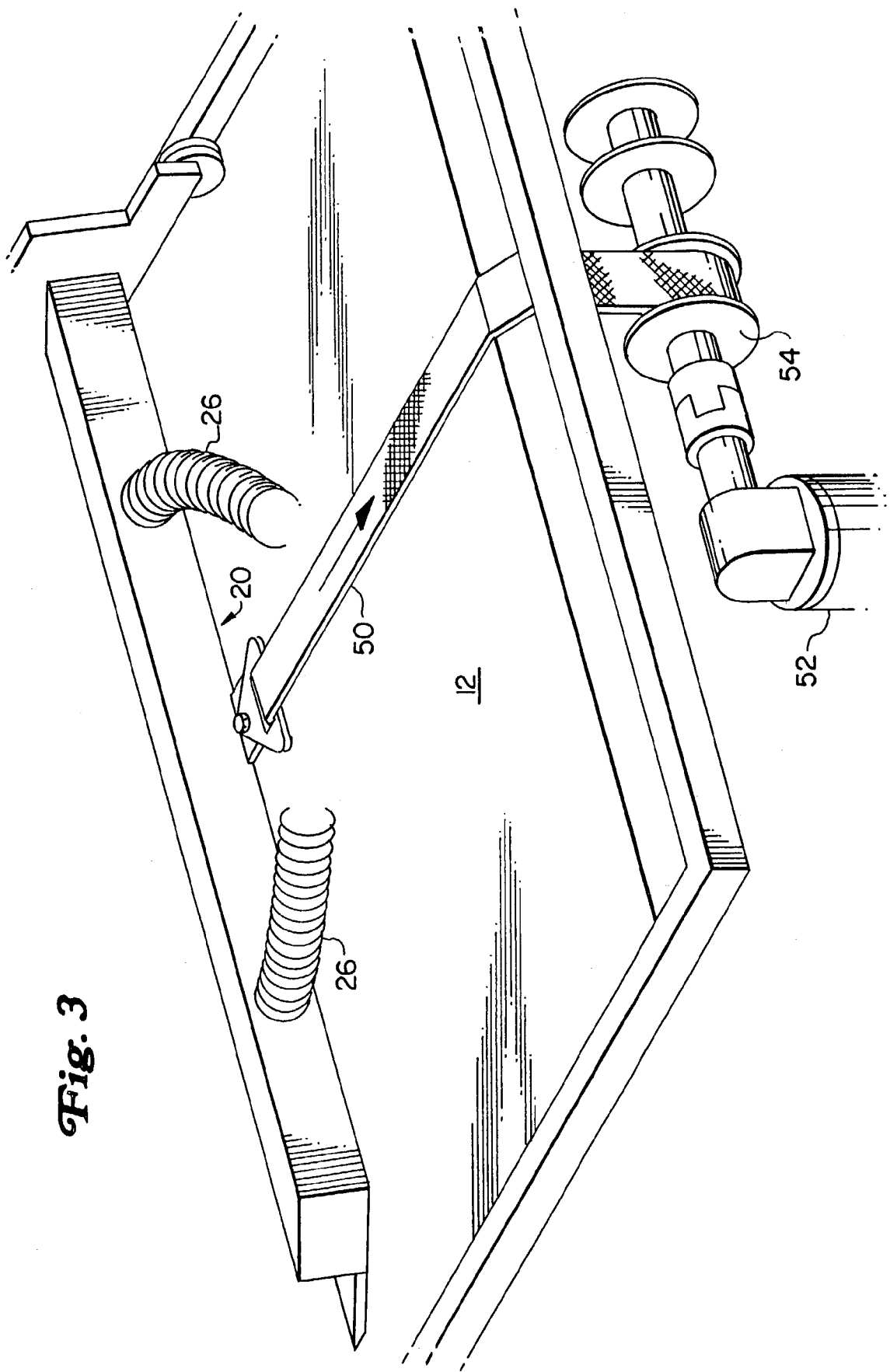
FIG. 3 is a view of the support surface showing the strap used for moving the lamination apparatus.

A mechanism is provided for passing movable vacuum assembly 20 longitudinally over the printing plate during the lamination process. In the embodiment shown, the mechanism comprises a strap 50 that is attached at one end to movable vacuum assembly 20 and at the other end to a spool 54 (FIG. 3). Activation of motor 52 causes spool 54 to revolve such that strap 50 winds around the spool, thereby pulling vacuum assembly 20 longitudinally from one end of the support surface toward the other so that it passes over the printing plate. The wheel/rail arrangement described above guides movement of the vacuum assembly over the support surface. Those of ordinary skill in the art will appreciate that the drive arrangement shown is merely one example of a possible mechanism to move vacuum assembly 20 over the printing plate, and other arrangements could be substituted within the scope of the invention. Although it is preferred to automate this movement via a device such as motor 52, non-automated or manual devices suitable for moving the vacuum assembly over the printing plate during the lamination operation, such as a crank, may also be substituted. When laminating a two-sided tape to a printing plate, a ⅕ hp (0.15 kw) gear motor with a gear ratio of 390:1 can be used. This motor has a capacity to travel 10 feet (3.05 m) in 60 seconds. Those skilled in the art will appreciate that the type of motor used is generally not critical, and that the specifications of the motor may vary for a particular lamination operation.

In a preferred mode of operation, the inventive apparatus may be used to apply an adhesive, such as two-sided tape, to a single printing plate or to multiple plates in a single lamination operation. When tape is to be laminated to multiple plates, the plates need not have the same thickness. Plates varying in thickness from, for example, 0.125 inch (0.32 cm) to 0.250 inch (0.64 cm) can be placed on the support surface and be easily accommodated in a single pass through the apparatus. Plates having larger or smaller thicknesses may be laminated by setting the thickness for the thickest plate.

The following discussion further describes the use of the inventive apparatus to laminate a two-sided tape to a printing plate:

A roll of two-sided tape is installed in said cradle defined by rods 38, 40, 42, which rods are generally parallel with the end of support surface 12. The leading edge of two-sided tape 44 is threaded through movable apparatus 20 as described above, and is pulled tight to remove any slack. The end of the roll is adhered to the end of support surface 12 as shown in FIG. 1. One or more printing plates are moved into position for lamination (FIGS. 1, 4, 5, and 6).

The vacuum pump is activated to create a negative force in the manifold 24, which force is translated across the width of the printing plate via fins 28. The vacuum is applied at a nip 60 defined by the convergence of printing plate 14, two-sided tape 44 and fin blade surface 30. See, e.g. FIG. 2, wherein the printing plate has been omitted for clarity. Application of vacuum at the nip 60 achieves two significant functions. First, the vacuum raises the printing plate(s) off the support surface to the level of the blade surface. This action creates a level surface as the leading edge of the two-sided tape meets (and adheres to) the plate. Second, the vacuum evacuates air from the nip (FIG. 2), thereby eliminating air entrapment between the two-sided tape and the printing plate during lamination.

When a vacuum is established, motor 52 is activated to pass movable vacuum assembly 20 over printing plate 14, thereby laminating the two-sided tape to the plate. As the two-sided tape unrolls during the lamination, it is in continuous contact with a level printing plate surface (due to the vacuum), thereby providing a clean lamination of the two-sided tape to the back of the printing plate without significant air entrapment. When the vacuum assembly reaches the end of the printing plate (FIG. 6), the motor and the vacuum pump are turned off, and the two-sided tape can be cut from the roll at the broken lines as shown.

Although the support surface shown in the drawings is sized such that only a single pass is necessary to laminate the printing plate, the support surface may be sized of a width such that two or more passes of the movable assembly are required to laminate the entire printing plate or plates.

Figure 7:
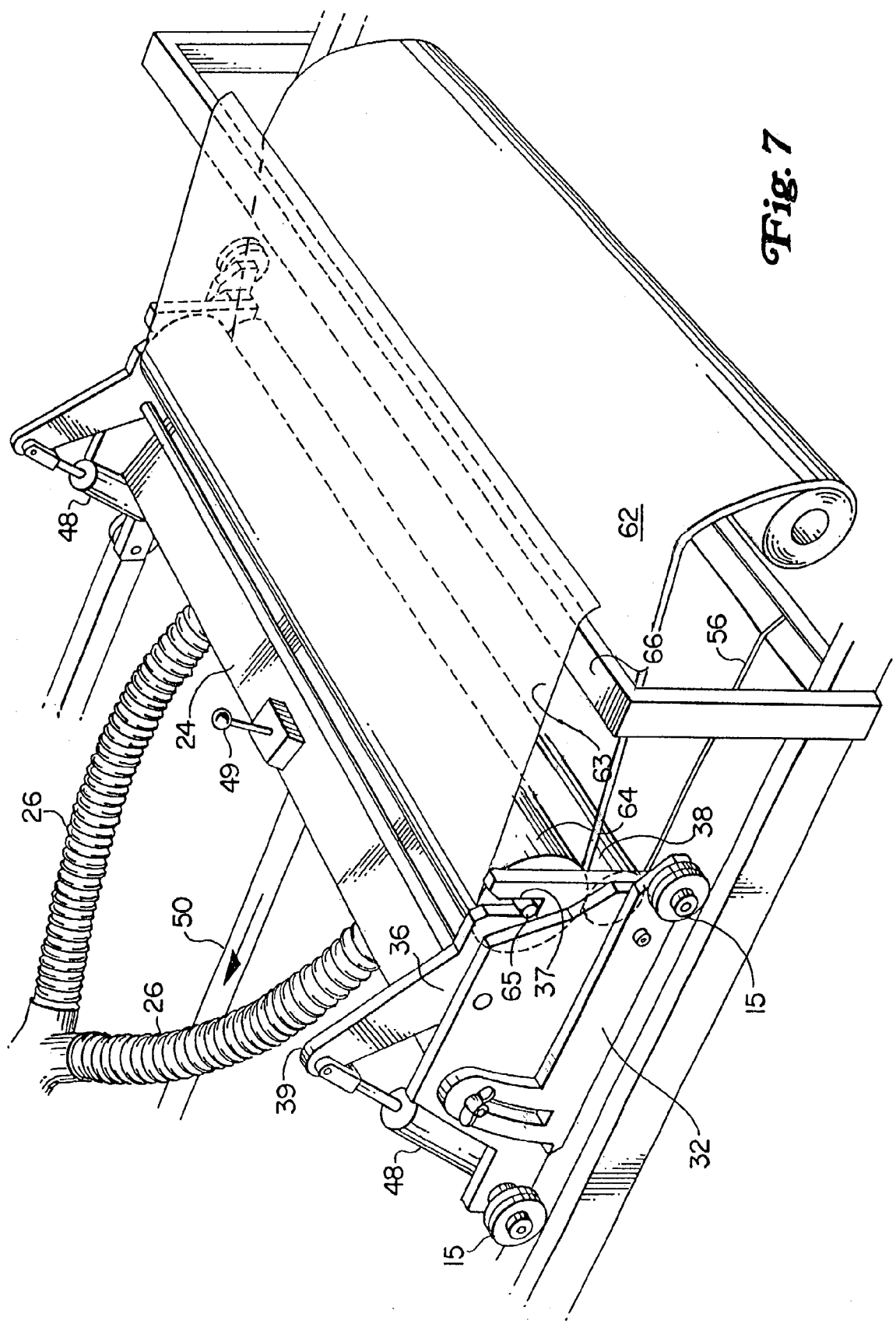
FIG. 7 is a perspective view of a support surface and the lamination apparatus for laminating a cushion material to a printing plate.
Figure 8:
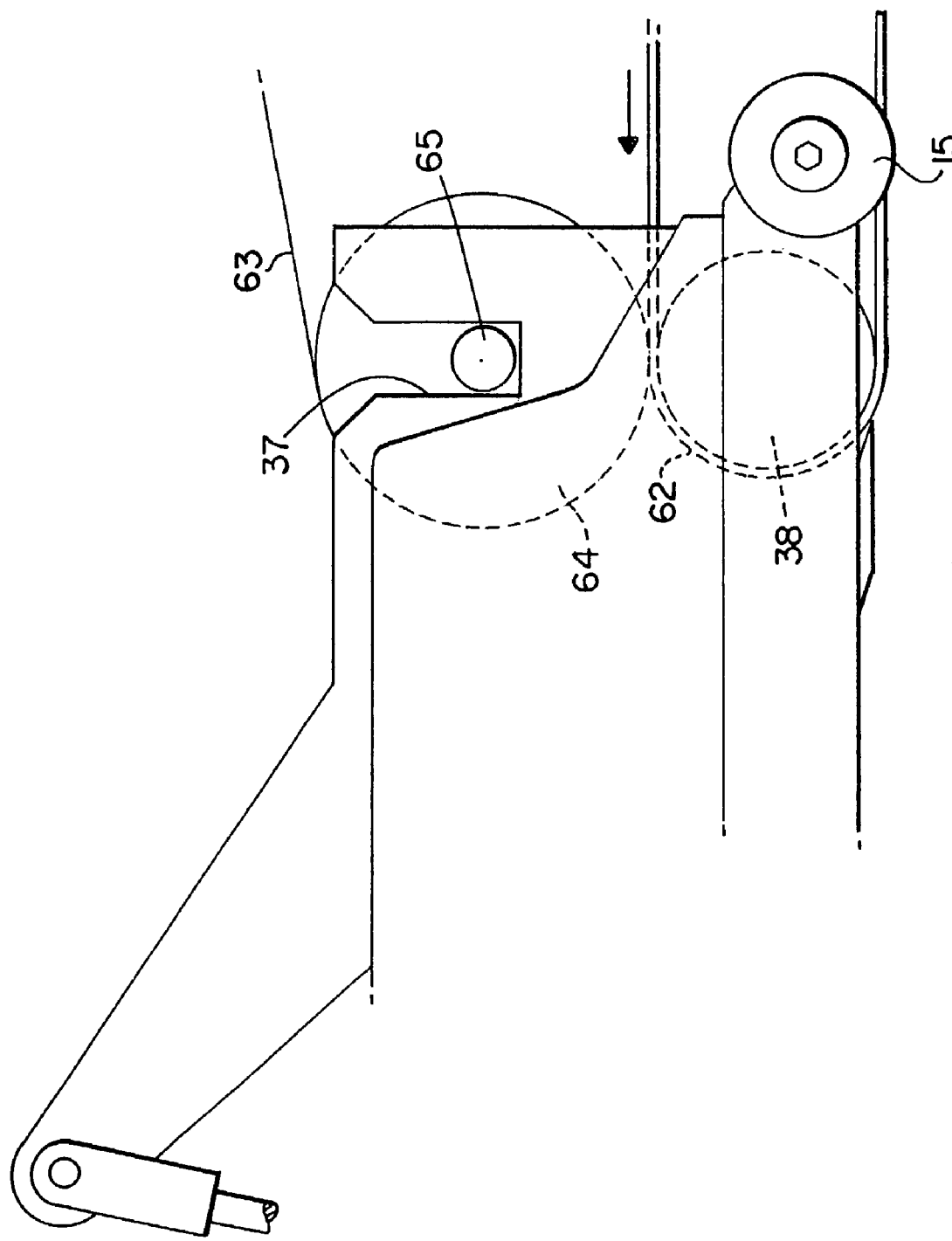
FIG. 8 is a side view, partially in section, of the lamination apparatus in the closed position for laminating a cushion material.

Lamination of a Cushion Material:

The following discussion describes one example of the use of the inventive apparatus to laminate a cushion material to a printing plate:

Unlike two-sided tape, commercially available foam cushion material is normally supplied with a cover sheet that protects the adhesive side of the cushion. Prior to lamination, the cover sheet must be removed, so that the adhesive side can be laminated to the printing plate. To separate the foam cushion material 62 from its cover sheet 63, a removal device such as cover sheet roll 64 may be inserted in movable vacuum assembly 20 to remove, or retain, the cover sheet of the foam cushion. Cover sheet roll 64 need not be a fixed part of the apparatus, and is preferably removable from the apparatus when other articles, such as two-sided tape, are laminated. In the embodiment shown in FIGS. 7 and 8, respective axles 65 at each end of roll 64 are received in slots 37 of frame members 22. Although slots 37 are shown formed in inner frame portion 36,(those skilled in the art will appreciate that any convenient mechanism for stabilizing removal device 64 may be substituted. Handle 49 is pushed forward to the "Open" position to create a path for the cushion material through movable assembly 20.

The cushion material is wrapped around roll 38 and threaded through movable assembly 20 with its cover sheet intact. The cover sheet is pulled over roll 64, and the cushion material with the adhesive is positioned in a line-up slot 56. (FIG. 7) The remaining cushion material is placed in an out-of-the way position, such as under the laminating table. The cover sheet is attached to a convenient surface so that it does not interfere with the lamination operation as the roll of cushion material passes through the lamination apparatus and as the cover sheet becomes detached from the cushion. In the embodiment shown, a cover sheet retention member such as bar 66 is provided for this purpose. The particular configuration of cover sheet retention bar 66 is not critical, as this element merely provides a convenient surface for attaching the end of the cover sheet as the lamination process is carried out. Handle 49 is then pushed back into the closed position.

The process for laminating cushion material is substantially the same as that for laminating two-sided tape, except that the cover sheet over the adhesive is pulled back from the foam cushion as described, and the cushion material is placed into a line-up slot in the laminating table.

Printing plates are normally formed from photopolymer materials such as PRISM and CYREL. Such material may be obtained from, among others, MacDermid Graphic Arts, of Atlanta, Ga., and E.I. DuPont de Nemours and Company, of Wilmington, Del. Other types of plates and surfaces may also be laminated utilizing the inventive apparatus and method, including, for example, plates made from natural and synthetic rubbers and plates made from PVC. Two-sided adhesive tape is widely available in the industry, and may be obtained from, for example, 3M Company of St. Paul, Minn., and MACtac of Stow, Ohio. Cushion material suitable for use with printing plates may be obtained from Conversion Technology Graphics, of West Unity, Ohio. Although the apparatus may be constructed to accommodate two-sided tape of virtually any length and width, the preferred length is between about 60 and 80 inches (about 1.5 and 2 m), and the preferred width is between about 40 and 52 inches (about 1 and 1.3 m).

Although the inventive apparatus and method have been described for use in laminating two-sided tape and cushion material to a printing plate, the invention is not so limited. The apparatus and method are useful for any purpose that requires the lamination of a component to a surface of an article, in a manner such that a clean attachment is realized, i.e., one substantially lacking the presence of entrapped air between the tape and the article.

It is therefore intended that the foregoing detailed description be regarded as illustrative rather than limiting, and that it be understood that it is the following claims, including all equivalents, that are intended to define the spirit and scope of this invention.

What is claimed is:

1. An apparatus for laminating an article to a printing plate, the printing plate being positioned on a support surface, wherein the apparatus comprises:
   a movable assembly engaged with said support surface and movable relative thereto, said movable assembly comprising a manifold member for receiving vacuum force from a source of vacuum, and a fin member for translating said vacuum force across substantially a width of the printing plate;
   a holder for holding said article, said holder being positioned such that an end of said article is engageable with said printing plate; and
   a moving device for passing said movable assembly and said article over said printing plate as said vacuum force is translated across said printing plate, such that said article is laminated to said printing plate without substantial air entrapment.

2. The apparatus of claim 1, wherein said manifold receives said vacuum force at a plurality of manifold locations.

3. The apparatus of claim 1, wherein said fin member comprises a plurality of vacuum chambers for receiving said vacuum force, and a blade surface for translating said vacuum force substantially across the width of the printing plate.

4. The apparatus of claim 1, wherein the movable assembly further comprises wheels positioned at each longitudinal edge of the movable assembly, said wheels being engageable with complementary rails positioned along each longitudinal side of the support surface.

5. The apparatus of claim 1, wherein the moving device comprises a motor.

6. The apparatus of claim 1, wherein said movable assembly further comprises a housing.

7. The apparatus of claim 6, wherein the housing comprises a frame member at at least one longitudinal edge of said movable assembly.

8. The apparatus of claim 6, where said housing comprises a frame member at each longitudinal edge of said movable assembly.

9. The apparatus of claim 8, wherein said article comprises a roll of two-sided tape, and said holder comprises a plurality of rods that span the respective frame members.

10. The apparatus of claim 8, wherein said article comprises a cushion having a cover sheet, and wherein the movable assembly further comprises a roll for directing said cover sheet during lamination of the cushion.

11. The apparatus of claim 8, wherein said frame members include at least one pivotable portion for adjusting said apparatus to laminate articles of variable thicknesses.

12. The apparatus of claim 11, wherein said rods are oriented in a cradle configuration.

13. An apparatus for laminating an article to a printing plate, comprising:
   a movable assembly engaged with a support surface and movable relative thereto, said movable assembly comprising a housing, a holder associated with the housing for holding the article, a manifold for receiving vacuum force from a source of vacuum, and a fin member having a leading end for translating the vacuum force across a width of the printing plate; the fin member leading end, the article to be laminated and the printing plate being oriented such that a nip is formed therebetween when the vacuum source is activated, and the printing plate is raised from the support surface at the nip substantially to the level of the fin member leading end; and
   a moving device for passing said movable assembly over the printing plate as the vacuum force is translated across the width of said printing plate, such that said article is laminated to said printing plate without substantial air entrapment.

14. The apparatus of claim 13, wherein the housing comprises a frame member at at least one longitudinal edge of said movable assembly.

15. The apparatus of claim 13, wherein said fin member comprises a plurality of chambers, and said fin member leading end comprises a blade-like surface.

16. The apparatus of claim 13, wherein the movable assembly further comprises wheels positioned at each longitudinal edge of the movable assembly, said wheels being engageable with complementary rails positioned along each longitudinal side of the support surface.

17. The apparatus of claim 13, wherein the moving device comprises a motor.

18. The apparatus of claim 13, wherein the article comprises a cushion having a cover sheet, and wherein the movable assembly further comprises a roll for directing said cover sheet during lamination of the cushion.

19. The apparatus of claim 18, further comprising a cover sheet retention member.

20. The apparatus of claim 13, where the housing comprises a frame member at each longitudinal edge of said movable assembly.

21. The apparatus of claim 20, wherein the holder spans the respective frame members.

22. The apparatus of claim 21, wherein said holder comprises a plurality of support members.

* * * * *